United States Patent
Thomas et al.

(10) Patent No.: US 12,006,183 B2
(45) Date of Patent: Jun. 11, 2024

(54) MOUNTING BRACKETS FOR CORD REELS

(71) Applicant: Hubbell Incorporated, Shelton, CT (US)

(72) Inventors: Benny Thomas, Williston Park, NY (US); Roy Itzler, Orange, CT (US)

(73) Assignee: Hubbell Incorporated, Shelton, CT (US)

( * ) Notice: Subject to any disclaimer, the term of this patent is extended or adjusted under 35 U.S.C. 154(b) by 837 days.

(21) Appl. No.: 17/077,342

(22) Filed: Oct. 22, 2020

(65) Prior Publication Data

US 2021/0126410 A1 Apr. 29, 2021

Related U.S. Application Data

(60) Provisional application No. 62/927,148, filed on Oct. 29, 2019.

(51) Int. Cl.
| | |
|---|---|
| *B65H 75/44* | (2006.01) |
| *H01R 13/72* | (2006.01) |
| *H01R 25/00* | (2006.01) |
| *H02G 11/02* | (2006.01) |

(52) U.S. Cl.
CPC .......... *B65H 75/446* (2013.01); *H01R 13/72* (2013.01); *H01R 25/006* (2013.01); *H02G 11/02* (2013.01)

(58) Field of Classification Search
CPC .... H01R 25/006; H01R 13/72; B65H 75/446; H02G 11/02
USPC ......................................... 242/406; 439/501
See application file for complete search history.

(56) References Cited

U.S. PATENT DOCUMENTS

| | | | | |
|---|---|---|---|---|
| 2,659,546 | A | | 11/1953 | Rotter et al. |
| 3,290,453 | A | * | 12/1966 | Jensen ............... B65H 75/4476 242/607.1 |
| 3,295,717 | A | | 1/1967 | Gantner |
| 3,698,656 | A | * | 10/1972 | Ballenger .............. B65H 75/38 242/608.8 |
| 3,840,713 | A | * | 10/1974 | Carpentier ......... B65H 75/4402 242/129 |
| 3,880,378 | A | * | 4/1975 | Ballenger .............. H02G 11/02 242/406 |

(Continued)

FOREIGN PATENT DOCUMENTS

| | | | | |
|---|---|---|---|---|
| KR | 20100033138 A | * | 3/2010 | ........... B65H 75/446 |
| WO | WO-9528753 A1 | * | 10/1995 | ........... H01R 13/514 |
| WO | WO-2016036328 A1 | * | 3/2016 | ......... B65H 75/4442 |

OTHER PUBLICATIONS

ECRP-10 Cord Reel with Gang Box by Akron Brass Company, 2019.
Coxreels EZ-Coil Safety Series Extension Cord Reel, 2019.

*Primary Examiner* — Zachary L Kuhfuss
(74) *Attorney, Agent, or Firm* — Ruggiero McAllister & McMahon LLC

(57) ABSTRACT

A mounting bracket for a cord reel assembly is provided. The bracket includes a base plate and a pair of side rails. The base plate has one or more mounting openings. The pair of side rails define a keyway between each of the side rails and the base plate. An assembly of a cord reel and the mounting bracket are also provided, as is a method of a method of installing a cord reel using the mounting bracket. In some embodiments, at least one rail of the pair of side rails includes a tongue extending therefrom. The tongue is configured for securement of a supply device thereto.

7 Claims, 6 Drawing Sheets

(56) References Cited

U.S. PATENT DOCUMENTS

| | | | | |
|---|---|---|---|---|
| 3,983,977 | A | * | 10/1976 | Crabb .................. H02G 11/02 |
| | | | | 242/396.9 |
| 4,083,621 | A | * | 4/1978 | Davidson .............. H02G 11/02 |
| | | | | 439/501 |
| 4,350,850 | A | * | 9/1982 | Kovacik ................ H02G 11/02 |
| | | | | 200/61.15 |
| 4,892,283 | A | | 1/1990 | Cutburth |
| 5,209,420 | A | * | 5/1993 | Simmons .............. H02G 11/02 |
| | | | | 242/406 |
| 5,700,158 | A | * | 12/1997 | Neiser ................. H01R 13/641 |
| | | | | 439/652 |
| 9,610,851 | B2 | | 4/2017 | DeBoer et al. |
| 2018/0212378 | A1 | * | 7/2018 | Black ...................... H02J 7/00 |
| 2021/0171314 | A1 | * | 6/2021 | Thomas ................ H02G 3/381 |

* cited by examiner

MOUNTING BRACKETS FOR CORD REELS

CROSS REFERENCE TO RELATED APPLICATIONS

This application claims the benefit of U.S. Application 62/927,148 filed Oct. 29, 2020, the entire contents of which are incorporated herein by reference.

BACKGROUND

1. Field of the Invention

The present disclosure is related to mounting brackets. More particularly, the present disclosure is related to mounting brackets for mounting a cord reel to a surface.

2. Description of Related Art

Reels for storing lengths of flexible material (hereinafter referred to as "cords") such as, but not limited to electrical extension cables, computer network communication cables, compressed air hoses, fluid hoses, and others are known.

It is often desired to mount the reel to a surface such as a wall or ceiling. The weight of some cord reels—as a result of the amount and/or type of cord on the reel, the features of the reel, and others—can make the mounting process difficult.

Additionally, the cord reel is often used in combination with a supply device. The need for the supply device can result in multiple trades (e.g., an electrician and a mechanic) being required to install the cord reel and the supply device. In the example of an electrical extension cord, the cord reel is used in combination with an electrical outlet. The mechanic must install the cord reel and the junction box on the desired surface. Then, the electrician can install an electrical outlet in the junction box and run an electrical feed to the outlet.

It has been determined by the present disclosure that there is a need for mounting brackets that overcome, alleviate, and/or mitigate one or more of the aforementioned and other deleterious effects of prior art cord reels.

SUMMARY

A mounting bracket for a cord reel assembly is provided. The bracket includes a base plate and a pair of side rails. The base plate has one or more mounting openings. The pair of side rails define a keyway between each of the side rails and the base plate.

In some embodiments either alone or together with any one or more of the aforementioned and/or after-mentioned embodiments, at least one rail of the pair of side rails includes a tongue extending therefrom. The tongue is configured for securement of a supply device thereto.

In some embodiments either alone or together with any one or more of the aforementioned and/or after-mentioned embodiments, mounting bracket can further include the supply device secured to the tongue.

In some embodiments either alone or together with any one or more of the aforementioned and/or after-mentioned embodiments, the supply device is a junction box.

A cord reel assembly is also provided. The assembly includes a cord reel and a mounting bracket. The reel has a pair of shoulders extending therefrom. The bracket has a base plate and a pair of side rails that define a keyway between each side rail and the base plate. The keyway of the pair of side rails are configured and positioned to receive the pair of shoulders of the cord reel, respectively.

In some embodiments either alone or together with any one or more of the aforementioned and/or after-mentioned embodiments, at least one rail of the pair of side rails comprises a tongue extending therefrom. The tongue is configured for securement of a supply device thereto.

In some embodiments either alone or together with any one or more of the aforementioned and/or after-mentioned embodiments, the cord reel assembly can further include the supply device secured to the tongue.

In some embodiments either alone or together with any one or more of the aforementioned and/or after-mentioned embodiments, the supply device is a junction box.

A method of installing a cord reel is also provided. The method includes the steps of securing a mounting bracket to a surface, the mounting bracket having a base plate and a pair of side rails that define a keyway between each side rail and the base plate; and securing the cord reel to the mounting bracket by inserting a pair of shoulders of the cord reel into the keyways.

In some embodiments either alone or together with any one or more of the aforementioned and/or after-mentioned embodiments, the method further includes the step of securing a supply device to a tongue extending from one of the pair of side rails.

The above-described and other features and advantages of the present disclosure will be appreciated and understood by those skilled in the art from the following detailed description, drawings, and appended claims.

DETAILED DESCRIPTION

Figure 1:
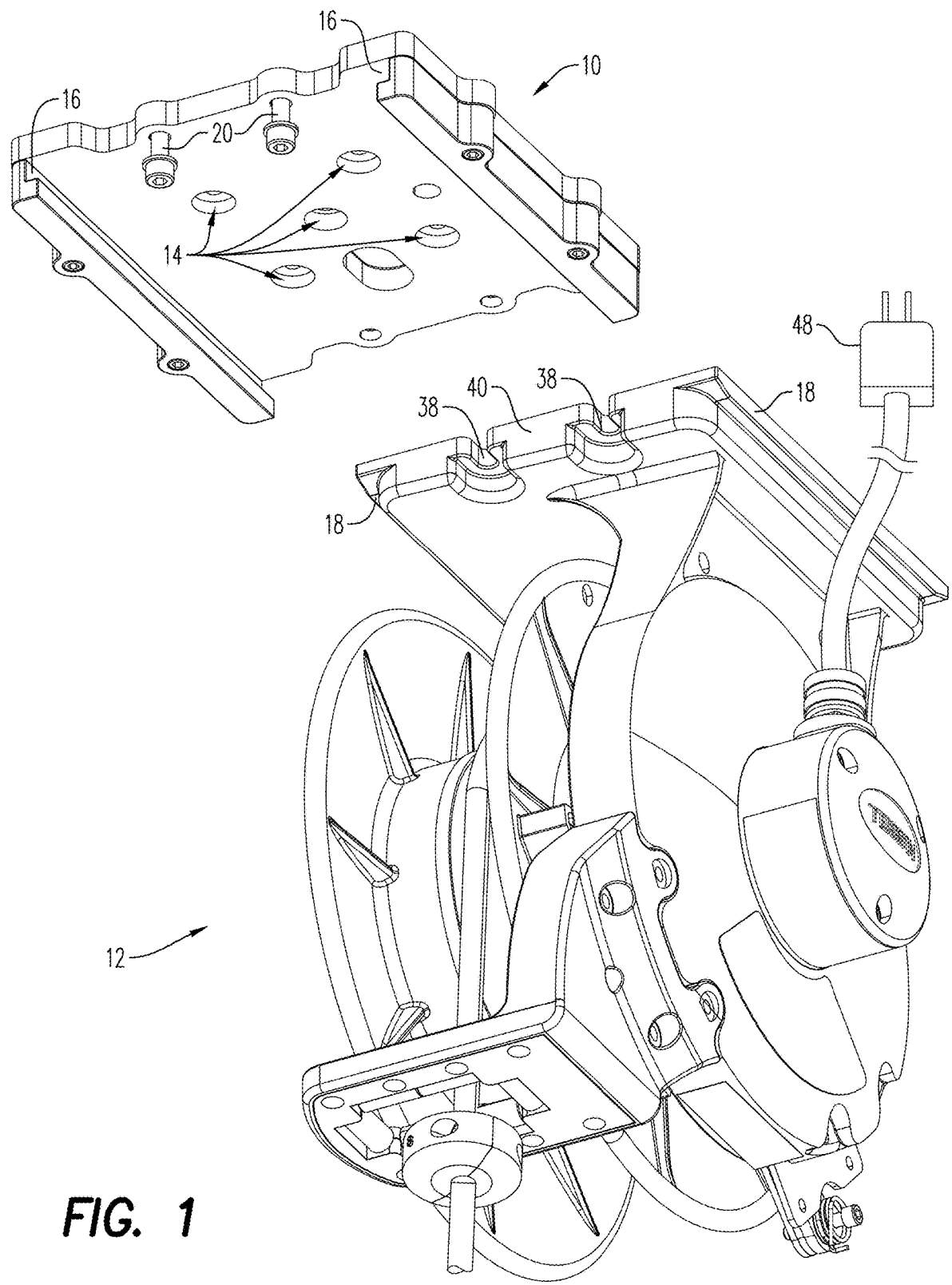
FIG. 1 is a perspective view of an exemplary embodiment of a mounting bracket according to the present disclosure during installation of a cord reel.
Figure 2:
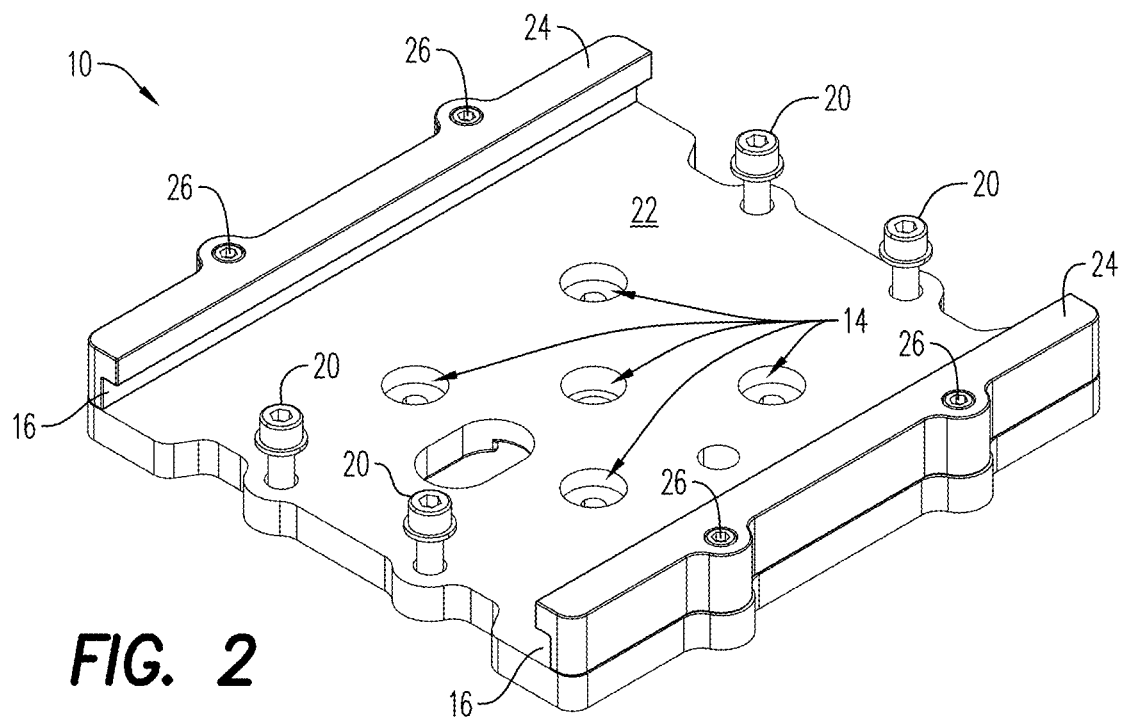
FIG. 2 is a perspective view of the mounting bracket of FIG. 1.
Figure 3:
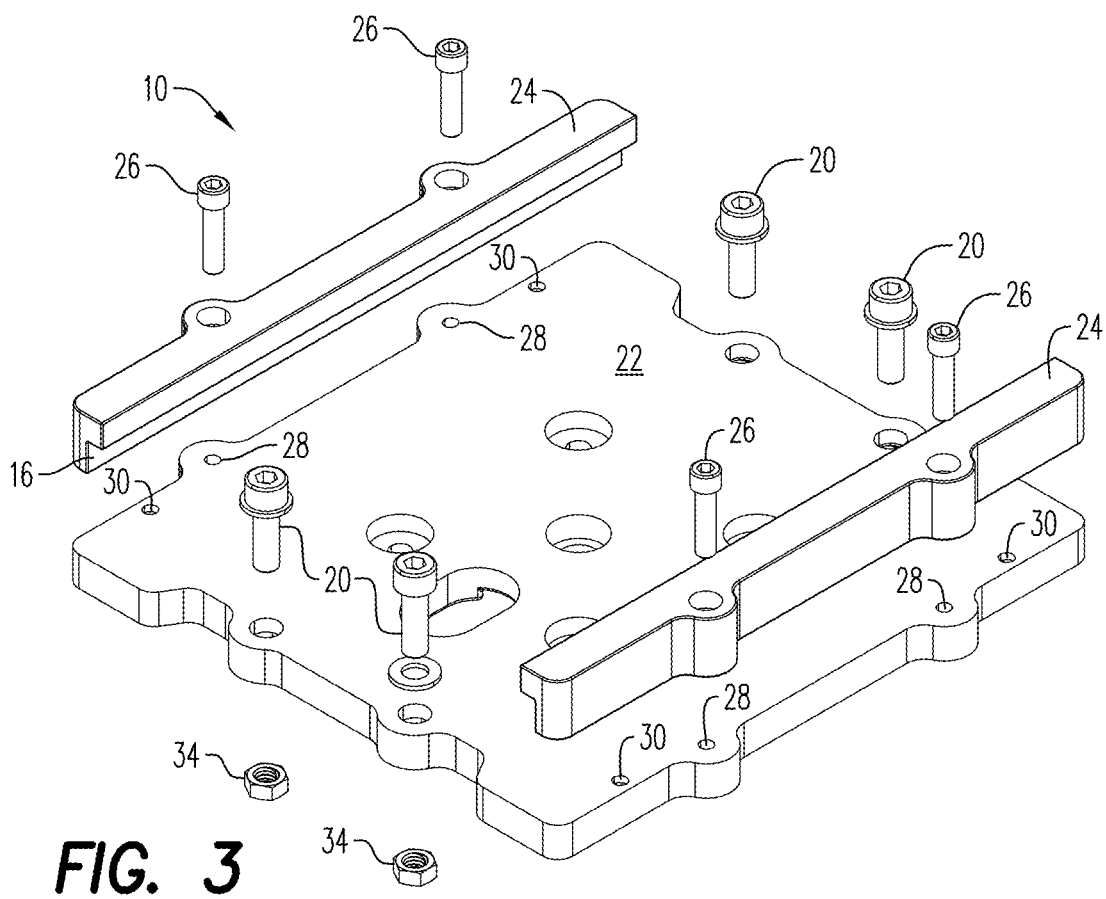
FIG. 3 is an exploded view of the mounting bracket of FIG. 1.
Figure 4:
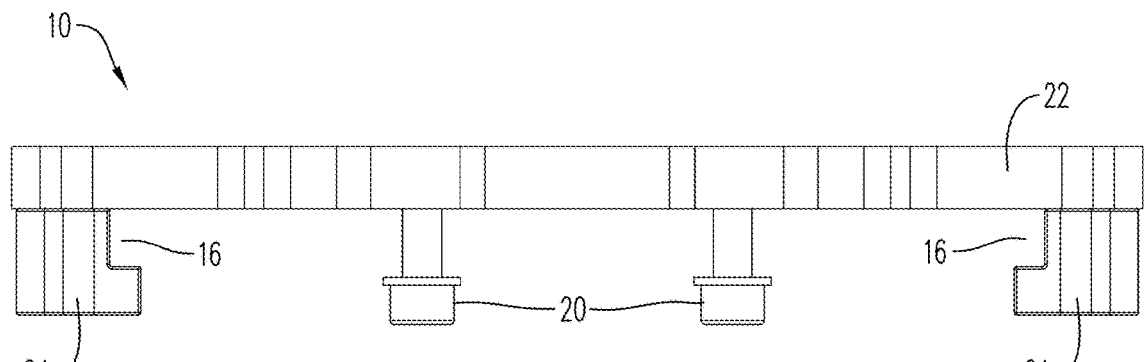
FIG. 4 is a side view of the mounting bracket of FIG. 1.
Figure 5:
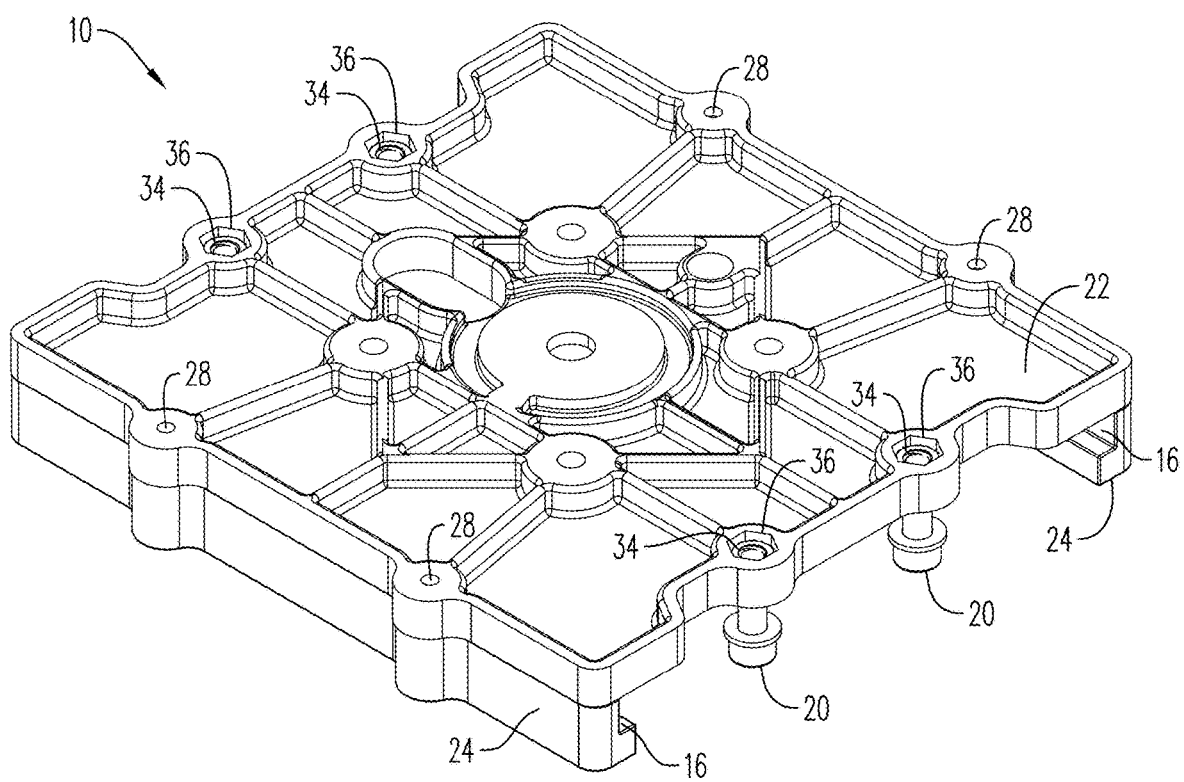
FIG. 5 is a bottom view of the mounting bracket of FIG. 1.

Referring to the drawings and in particular to FIG. 1, an exemplary embodiment of a mounting bracket according to the present disclosure is shown and is generally referred to by reference numeral 10 during installation of a cord reel 12.

Reel 12 is configured to store lengths of flexible material (hereinafter referred to as "cords") such as, but not limited to electrical extension cables, computer network communication cables, compressed air hoses, fluid hoses, and others.

Advantageously, bracket 10 is configured to allow for separating the securement of the bracket to the surface from the securement of reel 12 to the bracket.

Bracket 10 includes a plurality of mounting openings 14 that receive bolts (not shown) to secure the bracket to a desired surface. It should be recognized that bracket 10 is configured for securement to desired surfaces that are vertical (e.g., walls) or horizontal (e.g., ceilings or floors).

Bracket 10 includes a set of keyways 16 that receive a set of shoulders 18 of reel 12 to secure the reel to the bracket. In some embodiments, bracket 10 includes one or more connectors 20 that can be selectively removed to allow reel 12 to be inserted into bracket 10, then reattached to prevent the reel from being withdrawn.

In this manner, mounting bracket 10 can increase the ease and speed with which reel 12 can be secured to a desired surface.

Bracket 10 is described in more detail with respect to FIGS. 2-6.

Bracket 10 includes a base plate 22 and a pair of rails 24. Plate 22 includes openings 14 defined therein to secure the plate to the desired surface. Rails 24 are generally L-shaped to define keyways 16 between the rails and plate 22, respectively.

Figure 6:
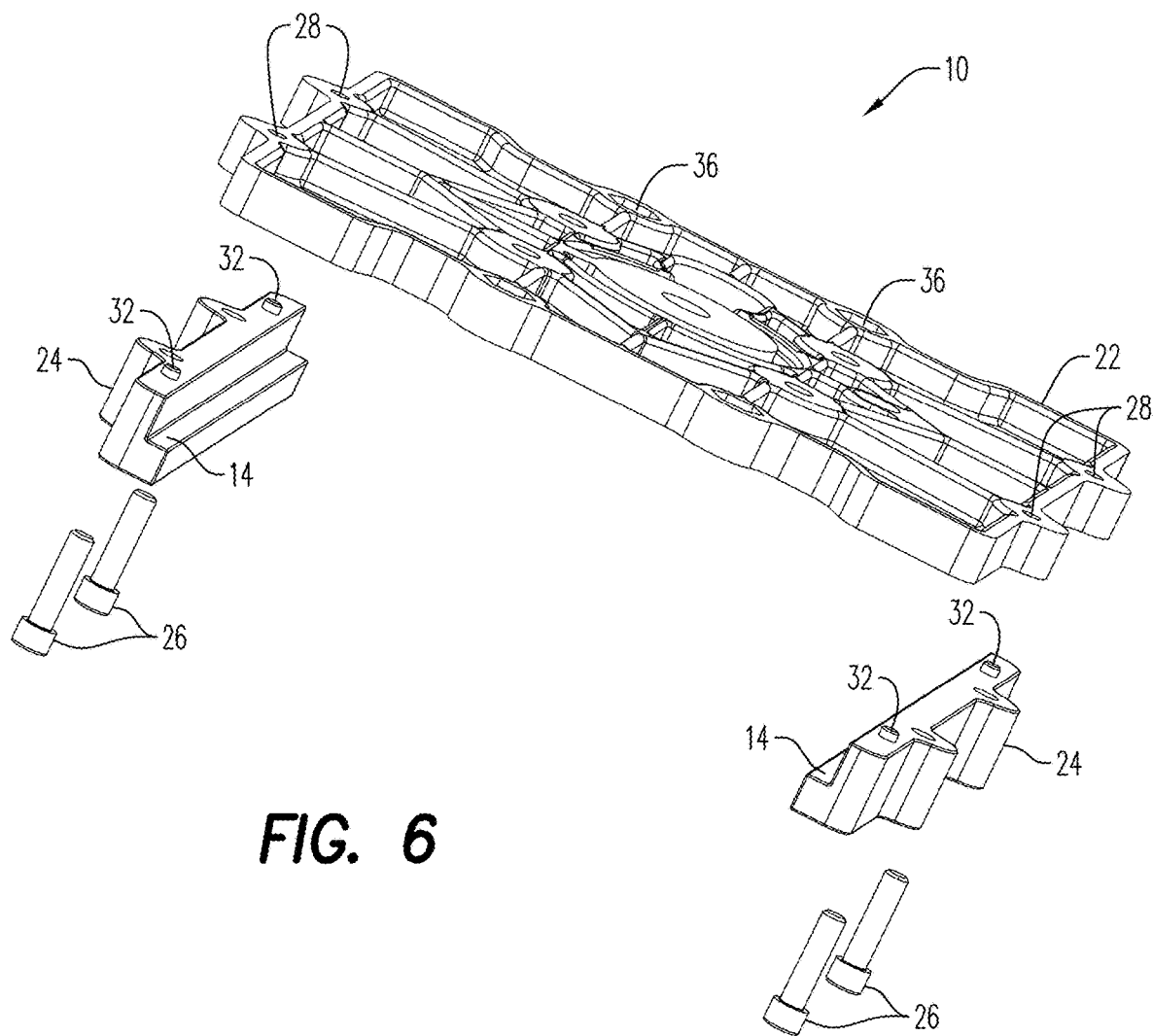
FIG. 6 is a bottom exploded view of the mounting bracket of FIG. 1.

In some embodiments, base plate 22 and rails 24 are secured to one another by one or more fasteners 26 (four shown). Fasteners 26 can be threadably connected directly to threaded openings 28 formed in rail 24. In some embodiments, plate 22 and rails 24 include corresponding alignment features 30, 32 formed thereon—where feature 30 is shown as an opening in plate 22 (FIG. 3) and feature 32 is shown as a peg in rail 24 (FIG. 6).

Of course, other methods of connection of plate 22 and rails 24 are contemplated by the present disclosure. Although plate 22 and rails 24 are illustrated as being separate pieces that are secured to one another by fasteners 26 and threaded openings 28, it is also contemplated by the present disclosure for plate 22 and rails 24 to be formed as a single unitary member.

Plate 22 and/or rails 24 can be formed of any material(s) having sufficient strength to secure reel 12 to bracket 10. For example, plate 22 and/or rails 24 can be formed of metal that is stamped, drawn, cast, molded, and/or machined to the desired shape.

Of course, it is contemplated by the present disclosure for plate 22 and/or rails 24 to be formed of other materials such as molded polymers.

In some embodiments, connectors 20 are bolts that connect to nuts 34 held in place within openings 36 in plate 22. In this manner, connectors 20 can be threadably removed from and attached to plate 22 while the plate is mounted to the desired surface.

During installation, bracket 10 is first mounted to the desired surface with appropriate bolts (not shown) through mounting openings 14. Next, connector(s) 20 from one side of bracket 10 are removed from plate 22 (shown in FIG. 1), while the connector(s) from the opposite side of the bracket are—preferably left in the plate. Reel 12 is aligned with bracket 10 so that shoulders 18 are received in keyways 16. Reel 12 is slid with respect to bracket 10 until the reel abuts connector(s) 20 remaining in plate 22. Once in place, connector(s) 20 are reinstalled in plate 22 so that reel 12 is captured in bracket 10 with shoulders 18 in keyways 16 and with connector(s) 20 on either side of the reel.

In other embodiments, reel 12 can include openings 38 that receive connectors 20. Here, openings 38 can be open at an edge 40 of reel 12. In this manner, reel 12 can be slid in bracket 10 until connector(s) 20 remaining in plate 22 are received in openings 38 and then connector(s) 20 are reinstalled in plate 22 and all of the connectors can be tightened.

Figure 7:
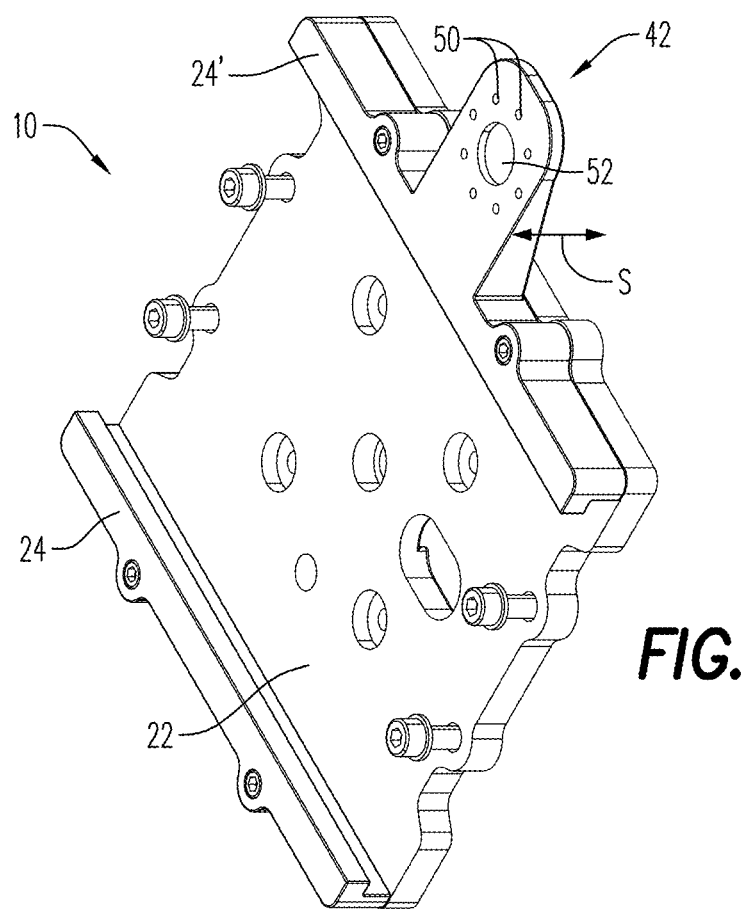
FIG. 7 is a top perspective view of the mounting bracket of FIG. 1 having an alternate embodiment of a side rail.
Figure 8:
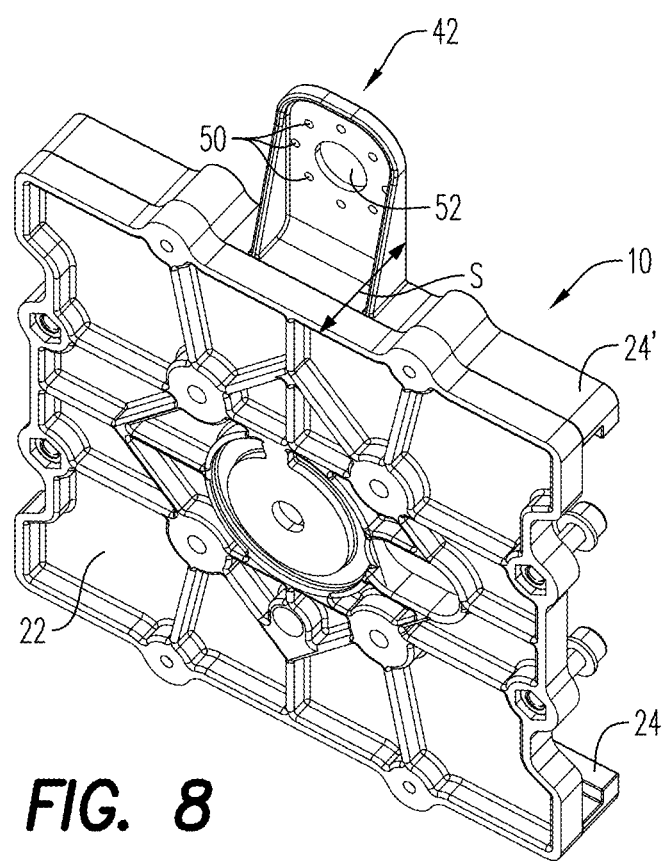
FIG. 8 is a bottom perspective view of the mounting bracket of FIG. 7.
Figure 9:
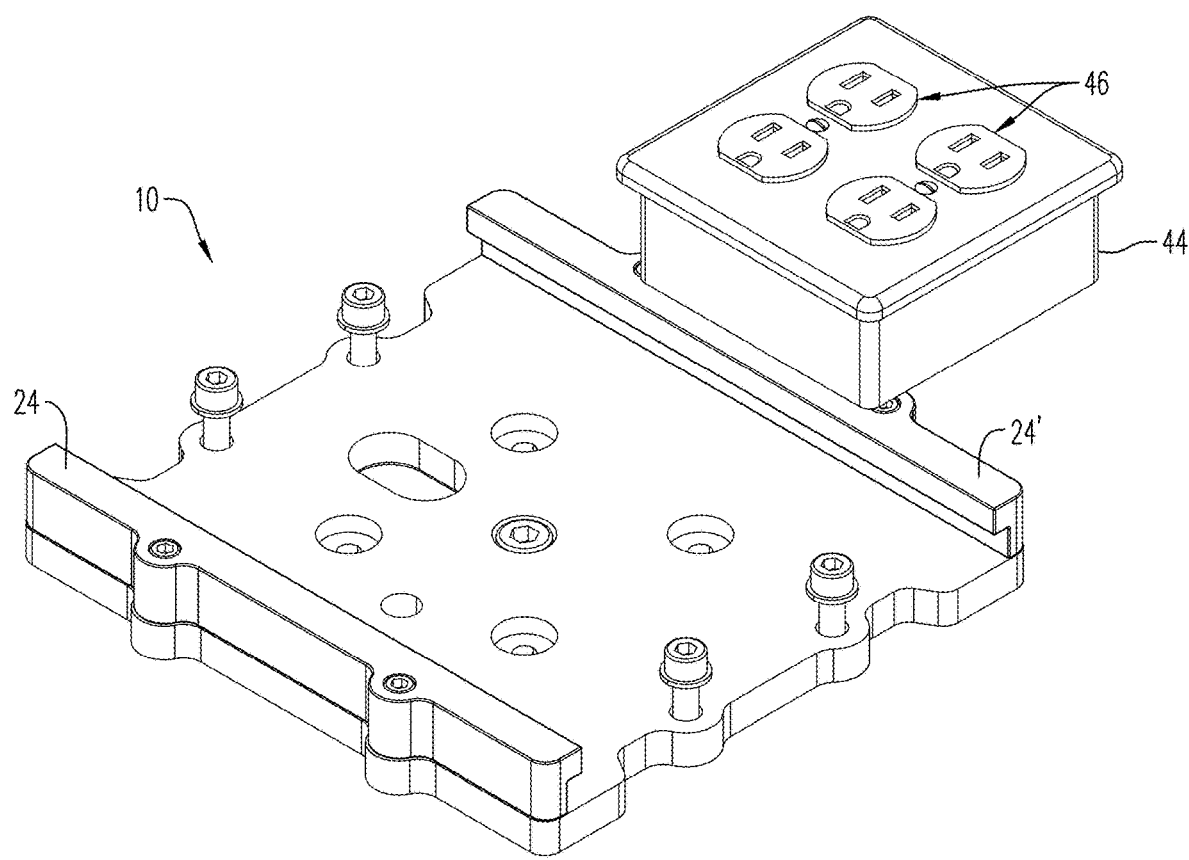
FIG. 9 is a top perspective view of the mounting bracket of FIG. 7 having a junction box secured to the side rail.

Turning now to FIGS. 7-9, bracket 10 is shown with an alternate exemplary embodiment of a side rail 24'. For brevity of discussion, only the differences between rail 24' and rail 24 are described herein below.

Rail 24' includes a tongue 42 extending therefrom. Tongue 42 is advantageously configured to secure a supply device 44 to bracket 10. In some embodiments, tongue 42 includes a plurality of openings 50 that allow supply device 44 to be secured thereto in a variety of different orientations or positions.

In the illustrated embodiment, supply device 44 is shown as a junction box housing one or more electrical outlets 46. Here, outlet 46 can be operatively connected to an electrical plug 48 (FIG. 1) of reel 12 to provides power to the cord stored therein.

Of course, supply device 44 can be any supply device configured to supply the cord stored in reel 12. In the example where the cord in reel 12 is a computer communication cable, supply device 44 can be a junction box having a female RJ45 connector. In the example where the cord in reel 12 is a conduit for compressed air, supply device 44 can be a compressed air manifold.

Tongue 42 can extend from a surface of rail 24' that is remote from plate 22. In this manner, a space (S) is defined between tongue 42 and the surface on which bracket 10 is mounted. Space (S) can allow bracket 10 to be configured for backfeeding of supply device 44 through an opening 52 in tongue 42.

During use, bracket 10 having rail 24' allows supply device 44 to be installed on tongue 42, which saves the time of having to separately secure the supply device to the mounting surface.

Accordingly, bracket 10 separates the securement of the bracket to the surface from the securement of reel 12 to the bracket, which is believed to increase the ease and speed with which reel 12 can be secured to a desired surface.

The engagement of shoulders 18 with keyways 16 provides the installer with a way to rest the weight of reel 12 on bracket 10 as the reel is slid into place. Moreover, connectors 20 that remain in plate 22 during the installation act as a stop to prevent reel 12 from passing through and out the other side of bracket.

The use of rail 24' eliminates the need to separately secure the supply device 44 to the surface, even further increase the ease and speed of installation.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A mounting bracket for a cord reel assembly, comprising:
   a base plate having one or more mounting openings; and
   a pair of side rails defining a keyway between each of the side rails and the base plate, wherein at least one rail of the pair of side rails comprises a tongue extending therefrom, the tongue being configured for securement of a supply device thereto.

2. The mounting bracket of claim 1, further comprising the supply device secured to the tongue.

3. The mounting bracket of claim 2, wherein the supply device is a junction box.

4. A cord reel assembly, comprising:
a cord reel having a pair of shoulders extending therefrom; and
a mounting bracket having a base plate and a pair of side rails that define a keyway between each side rail and the base plate, wherein the keyway of the pair of side rails are configured and positioned to receive the pair of shoulders of the cord reel, respectively, wherein at least one rail of the pair of side rails comprises a tongue extending therefrom, the tongue being configured for securement of a supply device thereto.

5. The cord reel assembly of claim 4, further comprising the supply device secured to the tongue.

6. The cord reel assembly of claim 5, wherein the supply device is a junction box.

7. A method of installing a cord reel, comprising:
securing a mounting bracket to a surface, the mounting bracket having a base plate and a pair of side rails that define a keyway between each side rail and the base plate;
securing the cord reel to the mounting bracket by inserting a pair of shoulders of the cord reel into the keyways; and
securing a supply device to a tongue extending from one of the pair of side rails.

\* \* \* \* \*